United States Patent [19]

Klinedinst et al.

[11] Patent Number: 4,684,583

[45] Date of Patent: Aug. 4, 1987

[54] ELECTROCHEMICAL CELL

[75] Inventors: Keith A. Klinedinst, Marlborough; Richard A. Gary, Everett, both of Mass.

[73] Assignee: GTE Laboratories Incorporated, Waltham, Mass.

[21] Appl. No.: 919,419

[22] Filed: Oct. 16, 1986

[51] Int. Cl.[4] .................... H01M 4/04; H01M 6/14
[52] U.S. Cl. ........................... 429/48; 429/52; 429/101; 429/137; 429/246
[58] Field of Search .............. 429/48, 101, 196, 137, 429/246, 52

[56] References Cited

U.S. PATENT DOCUMENTS

| 3,993,501 | 11/1976 | Kalnoki-Kis | 429/48 |
| 4,170,693 | 10/1979 | Catanzarite | 429/48 |
| 4,278,741 | 7/1981 | Kalnoki-Kis | 429/48 |
| 4,296,185 | 10/1981 | Catanzarite | 429/48 |
| 4,402,995 | 9/1983 | Fleischer | 429/101 |
| 4,503,088 | 3/1985 | Fleischer | 429/101 |
| 4,608,322 | 8/1986 | Howard et al. | 429/105 |

OTHER PUBLICATIONS

Fleischer et al, Reduction of Voltage Delay in the Li/-SOCl$_2$ System Via Cyanoacrylate Coatings on Lithium, Proceedings of the 30th Power Source Symposium, The Electrochemical Society, Inc., Jun. 7-10, 1982, pp. 172-175.

Primary Examiner—Donald L. Walton
Attorney, Agent, or Firm—David M. Keay

[57] ABSTRACT

A lithium/oxyhalide electrochemical cell in which the lithium anode electrode is coated with a cured epoxy resin film.

18 Claims, 4 Drawing Figures

ELECTROCHEMICAL CELL

BACKGROUND OF THE INVENTION

This invention relates to electrochemical cells. More particularly, it is concerned with electrochemical cells having an oxidizable active anode electrode, a cathode current collector, and an electrolytic solution comprising a reducible liquid cathode material, and an electrolyte solute dissolved therein.

A particularly effective class of electrochemical cells which employs soluble or liquid cathode materials, as opposed to the more conventional solid cathodes, has undergone rapid development in recent years. In these cells the active cathode material is usually a fluid solvent for an electrolyte solute which provides conductivity. The active anode electrode of the cell is usually of lithium or other highly electropositive metal. The solvent is usually a fluid oxyhalide, specifically thionyl chloride or sulfuryl chloride. During discharge of the cell the solvent is electrochemically reduced on a cathode current collector.

There are some problems which limit the usefulness of liquid cathode electrochemical cells. Among the problems are those relating to cell performance after prolonged storage and to their resistance to abusive treatment, such as short circuiting. During storage the lithium anode reacts with the liquid cathode material causing anode corrosion and passivation of the lithium metal. During accidental short circuiting relatively high internal temperatures may occur within the cell consequently increasing the rate of reaction between lithium and the liquid cathode material leading to still higher temperatures and the possibility of thermal runaway.

Various techniques have been employed to reduce the problems of anode corrosion and anode passivation, including coating the anode electrode with an organic polymer film. Techniques for coating anode electrodes with vinyl polymer films are discussed, for example, in U.S. Pat. Nos. 3,993,501, and 4,278,741 to Kalnoki-Kis. U.S. Pat. Nos. 4,170,693, and 4,296,185 to Catanzarite and U.S. Pat. Nos. 4,402,995, and 4,503,088 to Fleischer describe techniques of coating lithium anodes with cryanoacrylates. Although improvements in storage life and in reducing the problems of accidental circuits have been obtained in electrochemical cells fabricated in accordance with the teachings in the foregoing patents, it is desirable to improve further the characteristics of cells after prolonged storage and also to reduce further the problems of short circuits

SUMMARY OF THE INVENTION

Electrochemical cells in accordance with the present invention display improved characteristics due to reduced anode passivation and are less susceptible to damage under short circuit conditions. An electrochemical cell in accordance with the present invention comprises an oxidizable anode electrode, a cathode current collector, and an electrolytic solution which is in contact with the anode electrode and the cathode current collector. The electrolytic solution comprises a reducible liquid cathode material with an electrolyte solute dissolved therein. The surface of the anode electrode in contact with the electrolytic solution is coated with a layer of cured epoxy resin.

In accordance with another aspect of the invention, the method of reducing passivation of an oxidizable anode electrode used in an electrochemical cell having a reducible liquid cathode material comprises providing on the surface of the anode electrode a layer of cured epoxy resin.

DETAILED DESCRIPTION

Figure 1:
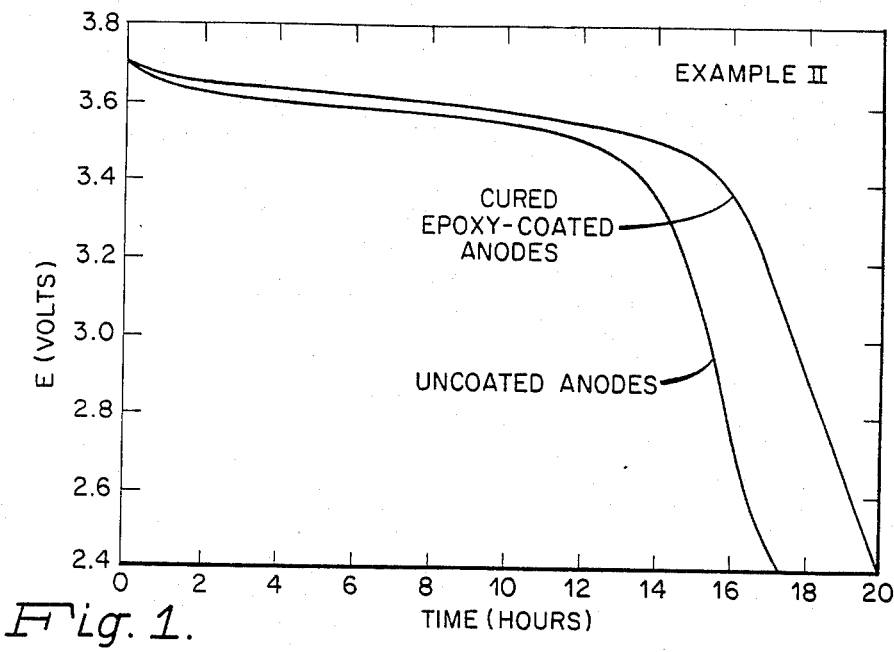
FIG. 1 shows discharge curves comparing electrochemical cells in accordance with the present invention with previously known cells.

Electrochemical cells in accordance with the present invention employ an anode electrode, a cathode current collector, and an electrolytic solution which is in contact with the anode and cathode current collector. The anode electrode and cathode current collector are separated from each other by a thin porous layer of insulating material. The electrolytic solution comprises a fluid, reducible soluble cathode material with an electrolyte solute dissolved therein.

The anode electrode is of an oxdizable material, preferably lithium metal. Other oxidizable materials, which may be employed in electrochemical cells of this type include other alkali metals and also alkaline earth metals. The cathode current collector includes a conductive substrate with layers of carbon black bonded thereto. The electrolytic solution comprises a solvent of a reducible liquid cathode material. Among the cathode materials found useful are fluid oxyhalides, fluid non-metallic oxides, fluid non-metallic halides, and mixtures thereof. An electrolyte solute is dissolved in the solvent in order to raise its conductivity. A thorough discussion of various useful anode materials, cathode solvents, and electrolyte solutes is provided in U.S. Pat. No. 4,219,443 to Klinedinst and Murphy.

In accordance with the present invention the anode electrode is coated with a layer or film of cured epoxy resin. An epoxy resin found particularly suitable is formed by the reaction between bisphenol-A and epichlorohydrin. The resin is transformed to a tough, solid, themoset state by combining with a suitable curing agent. Other epoxy resins which may be employed are epoxy novolac resins and tetrafunctional resins. Curing agents which may be used with epoxy resins include linear polyamines, aromatic amines, amine adducts, polyamides, amidoamines, acid anyhydrides, Lewis acid complexes, and combinations of these materials.

The epoxy resin and curing agent are dissolved in a suitable solvent. The resulting solution is applied by dipping the anode electrode in the solution or by brushing, spraying, or otherwise coating the liquid solution on the anode electrode. The material is cured, typically by heating a suitable temperature to reduce the curing time. A solid, adherent film of between 10 and 20 $\mu$m is produced on the surface of the anode electrode.

Detailed information on various epoxy resins and curing agents may be found in the EPON Resin Structural Reference Manual—SC: 67–81 published by Shell Chemical Company. If desired, the epoxy resin and curing agent may also be mixed with a flexiblizing resin in order to provide a cured protective coating which has a desired degree of flexibility to prevent loss of adhesion to the anode electrode during assembly of the electrochemical cell.

The following examples are for the purpose of further illustrating and explaining the present invention, and are not to be taken as limiting the scope thereof.

EXAMPLE I

Lithium anode electrodes were formed by pressing lithium sheets 5.5 $cm^2$ by 0.5 mm thick onto each side of expanded nickel screen anode current collectors. An epoxy resin coating was applied by dipping each anode in a solution of 2.5 g of EPON 826 and 2.5 g EPON V-40 in 30 $cm^3$ of redistilled tetrahydrofuran (THF). EPON 826 is a bisphenol A epoxy resin and EPON V-40 is an aliphatic polyamine curing agent. After fifteen minutes at ambient temperature in order to evaporate most of the excess solvent, the assemblies were heated at 110° C. for one hour producing protective cured epoxy resin films from 10 to 20 $\mu m$ thick.

Coated anodes were sandwiched between bonded carbon black cathode current collectors which separated from the anode electrodes by 5 mil glass-fiber separators. Each arrangement of anode and cathode current collectors was immersed in a case filled with 1.5M lithium tetrachloroaluminate ($LiAlCl_4$) in sulfuryl chloride ($SO_2Cl_2$). For comparison purposes similar cells were constructed with the anode electrodes left uncoated and with the anode electrodes coated with poly(Me-2-cyanoacrylate) according to the teachings of the aforementioned patents.

Some cells were stored for one month at 72° C. and some cells were stored for two months at 25° C. After storage each hermetically sealed cell was opened, and the anode electrodes were rinsed with redistilled THF and dried. The remaining lithium was reacted with distilled water, and the resulting solutions were titrated with standardized HCl solutions to determine the amount of lithium lost through self-discharge during storage. The results of these analyses are compared in Table 1. Each datum is the average for three cells of each type under each set of storage conditions.

TABLE 1

| Anode Coating | Li Lost During Storage for 2 mos. at 25° C. (mAh equiv/$cm^2$) | Li Lost During Storage for 1 mo. at 72° C. (mAh equiv/$cm^2$) |
|---|---|---|
| Uncoated | 13.4 | 17.2 |
| Cyano-acrylate | 8.0 | 17.0 |
| Cured Epoxy | 8.4 | 9.3 |

As shown in Table 1 both of the anode coatings significantly reduced the extent of self-discharge during storage at ambient temperature. However, although the cyanoacrylate coating had no significant effect upon self-discharge on cells stored at 72° C., a 45% reduction in self-discharge was obtained with the cured epoxy resin coating.

EXAMPLE II

Lithium anode electrodes prepared in the manner described in Example I were coated with an epoxy resin of 2.5 g EPON 826 together with 2.5 g of EPON 871, an aliphatic epoxy resing which acts as a flexibilizer, and an aliphatic amine curing agent of 2.5 g of Ancamine 1833 in 30 $cm^3$ of THF. Electrochemical cells were prepared with these anode electrodes as in Example I, and similar cells with uncoated and with cyanoacrylate-coated lithium electrodes were also prepared. The cells were fully discharged through 65 ohm loads. The resulting discharge curves were analyzed to 2.8 volts to determine the average load voltages, current densities, discharge capacities, and anode utilization efficiencies as listed in Table 2.

TABLE 2

| Anode Coating | $E_{avg}$(V) | $I_{avg}$(mA/$cm^2$) | C(Ah) | Anode Utilization (%) |
|---|---|---|---|---|
| Uncoated | 3.52 | 5.1 | 0.86 | 81 |
| Cyano-acrylate | 3.49 | 5.0 | 0.90 | 84 |
| Cured Epoxy | 3.52 | 5.1 | 0.99 | 88 |

As indicated, neither of the polymer coatings had a significant effect upon average load voltage or current density. However, modest increases in capacity and anode efficiency were obtained with cells containing cyanoacrylate-coated anode electrodes. More significantly, a 15% increase in capacity and a 7% increase in anode utilization were achieved with cells employing the cured epoxy-coated anode electrodes. These results appear to show a considerable lowering of the anode self-discharge rate during normal discharge due to the presence of the cured epoxy resin film. In addition, the cured epoxy resin film appears to be sufficiently conductive to avoid significant resistance polarization. FIG. 1 shows typical 5 mA/$cm^2$ discharge curves obtained with uncoated lithium anodes compared to cured epoxy resin-coated anodes in accordance with the present invention.

EXAMPLE III

Figure 2:
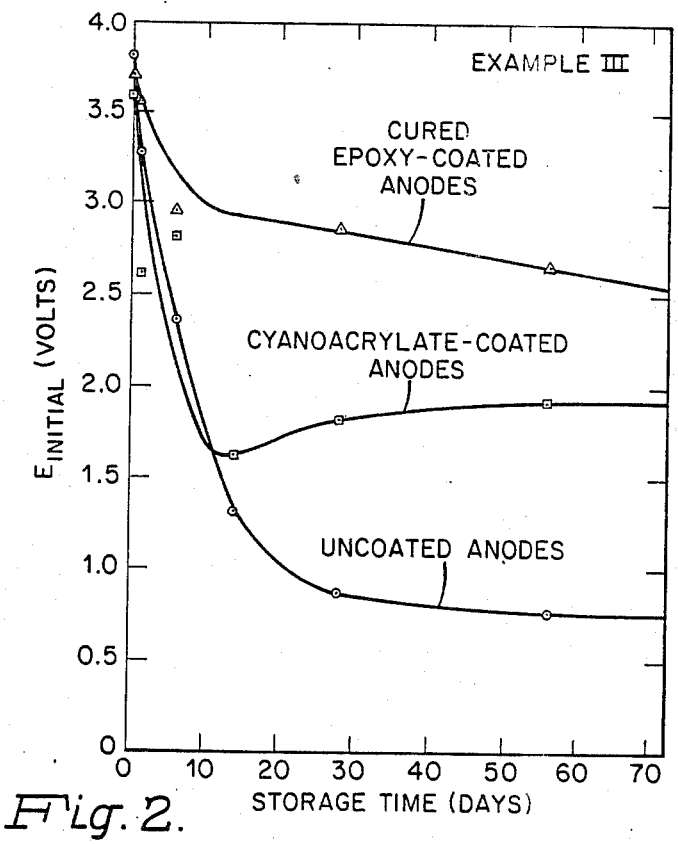
FIG. 2 shows curves of initial voltage versus storage time comparing electrochemical cells in accordance with the present invention with previously known cells.
Figure 3:
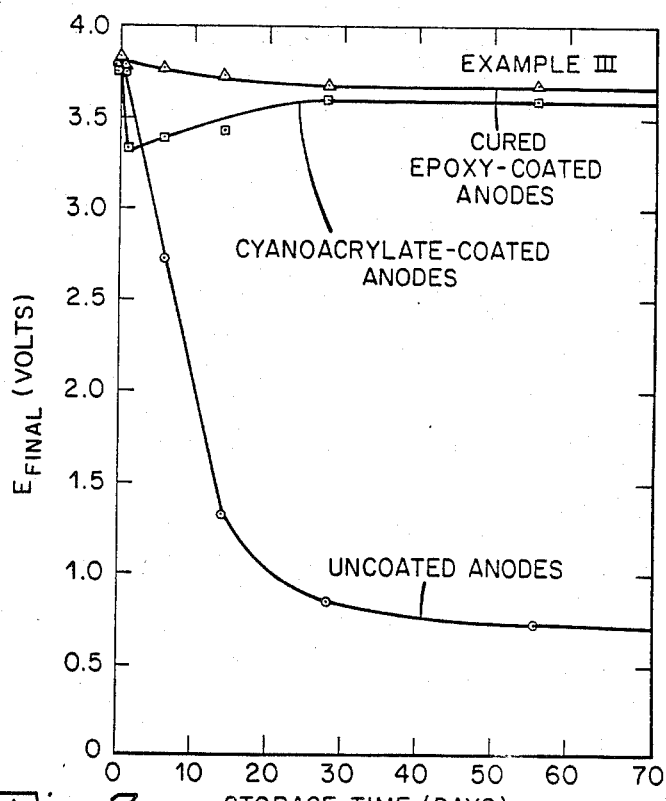
FIG. 3 shows curves of final voltage versus storage time comparing electrochemical cells in accordance with the present invention with previously known cells.

Electrochemical cells identical with those described in Example II with uncoated, cyanoacrylate-coated, and cured epoxy resin-coated anode electrodes were stored for two months at 25° C. Periodically these cells were discharged for up to 5 minutes through 125 ohm loads so as to determine their initial polarization (voltage delay) characteristics. The initial and final voltages and the times required to reach 90% of the final voltages are listed versus the elapsed storage time in Table 3. The final voltage is the plateau voltage reached after operation of the cell for a period of time under constant load. The initial and final voltages are plotted versus elapsed storage time in FIGS. 2 and 3, respectively.

TABLE 3

| Storage Time (Days) | $E_{init}$ (V) | → | $E_{final}$ (V) | t to 0.9 $E_{final}$ (s) |
|---|---|---|---|---|
| Uncoated | | | | |
| 0 | 3.82 | → | 3.80 | — |
| 1 | 3.28 | → | 3.74 | 1.2 |
| 6 | 2.35 | → | 2.72 | 0.8 |
| 14 | 1.30 | → | 1.31 | — |
| 28 | 0.86 | → | 0.84 | — |
| 56 | 0.75 | → | 0.73 | — |
| Cyanoacrylate-Coated | | | | |
| 0 | 3.58 | → | 3.76 | 1.5 |
| 1 | 2.62 | → | 3.32 | 2.5 |
| 6 | 2.82 | → | 3.38 | 1.5 |
| 14 | 1.62 | → | 3.42 | 4.5 |
| 28 | 1.82 | → | 3.60 | 2.0 |
| 56 | 1.90 | → | 3.58 | 3.0 |

TABLE 3-continued

| Storage Time (Days) | $E_{init} \rightarrow E_{final}$ (V)   (V) | t to 0.9 $E_{final}$ (s) |
|---|---|---|
| | Epoxy-Coated | |
| 0 | 3.70 → 3.84 | 3.5 |
| 1 | 3.56 → 3.79 | 0.8 |
| 6 | 2.96 → 3.76 | 1.8 |
| 14 | 3.02 → 3.73 | 2.5 |
| 28 | 2.85 → 3.66 | 0.5 |
| 56 | 2.65 → 3.68 | 0.9 |

As indicated, the rate capability of cells with uncoated anodes deteriorated rapidly with increasing storage time. In contrast, and particularly after storage for several weeks, cells with polymer-coated anode electrodes exhibited much less voltage delay. In addition, the initial and final voltages of the cured epoxy resin-coated electrodes were uniformly higher than the corresponding quantities obtained with the cyanoacrylate coated anode electrodes.

EXAMPLE IV

Figure 4:
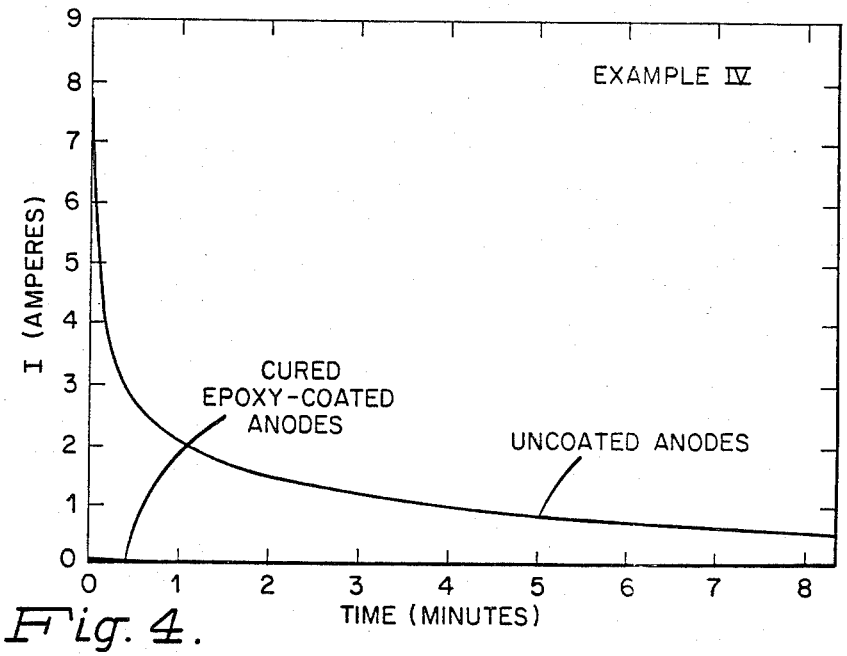
FIG. 4 shows curves of short circuit current versus time comparing electrochemical cells in accordance with the present invention with previously known cells.

Electrochemical cells were fabricated with uncoated lithium anode electrodes and with cured epoxy resin-coated electrodes as described in Example I. Within an hour of their fabrication the cells were externally shorted for an 8-minute period. Cell currents, voltages, and case temperatures were recorded as a function of time. The initial current, average current, total capacity drawn from the cell, and maximum case temperature measured with the uncoated and cured epoxy resin-coated anode electrode cells are compared in Table 4. Typical short circuit current versus time curves are compared in FIG. 4.

TABLE 4

| Anode Coating | $I_{init}$(A) | $I_{avg}$(A) | C(mah) | $T_{max}$(°C.) |
|---|---|---|---|---|
| Uncoated | 7.76 | 1.36 | 181 | 80 |
| Cured Epoxy | 0.09 | 0.004 | 0.6 | 25 |

The initial short circuit current measured with cured epoxy resin-coated anode electrode was only 1% of the value obtained with an uncoated anode electrode. Similarly, the average current and capacity obtained with a cured epoxy resin-coated anode electrode are a small fraction of those produced in a cell with an uncoated anode electrode. As shown in Table 4, an 80° C. cell case temperature was recorded during the shorting of an uncoated anode electrode cell, while no rise in cell case temperature was noted upon short circuiting a cured epoxy resin-coated anode electrode cell. Thus, cells with cured epoxy resin-coated anode electrodes are more abuse resistant.

EXAMPLE V

Lithium anode electrodes as described in Example I were fabricated and coated with EPON 828, a bisphenol-A liquid epoxy resin, combined with EPON curing agent Z, an aromatic polyamine. The coating solution was of 6.7 g of the liquid resin and 1 g of the curing agent dissolved in purified THF. The lithium anode electrodes were coated by dipping in the solution. After most of the solvent had evaporated, the polymerization process was completed by heating the anode electrodes for 2 hours in a vacuum at 150° C. Each anode electrode was sandwiched between cathode current collectors of a mixture of 1 part Cabot Black Pearls 2,000 and 3 parts Gulf AB50P acetylene black bonded to a conductive substrate. The cell cases were filled with an electrolytic solution of 1.5M lithium tetrachloroaluminate ($LiAlCl_4$) in thionyl chloride ($SOCl_2$) and hermetically sealed.

After storage for 2 months at 250° C., each cell was discharged briefly through a 125 ohm load. Each cell was opened and the quantity of lithium lost through self-discharge determined in accordance with the procedure described in Example I. Table 5 lists average values of lithium lost through self-discharge during storage, the initial and final voltages, and time required to reach 90% of the final voltage for cells as described and for similar cells with uncoated anode electrodes.

TABLE 5

| Anode Coating | Li Lost (mAh equiv/$cm^2$) | $E_{init} \rightarrow E_{final}$ (V)   (V) | t to 0.9 $E_{final}$ (s) |
|---|---|---|---|
| Uncoated | 3.0 | 2.02 → 3.34 | 8.5 |
| Cured Epoxy | 1.6 | 2.48 → 3.35 | 4.4 |

As indicated in cells having the cured epoxy resin anode coating the rate of self-discharge was reduced to approximately one-half that of cells with uncoated anode electrodes. In addition, the initial voltage increased by nearly 0.5 volts, and the rise time of the voltage profile was shortened to approximately one-half.

EXAMPLE VI

Measurements similar to those described in Example V were performed on electrochemical cells similar to those in Examle V except for the cured epoxy resin coating on the anode electrodes. The anode electrodes were coated with a solution of EPON 1031, a tetrafunctional resin, and EPON curing agent Y, an aromatic polyamine, dissolved in purified THF. The procedures described in Example V were employed to coat the anode electrodes and produce a cured epoxy resin coating. The cells were stored for 2 months at 25° C. In Table 6 the self-discharge and initial polarization data obtained for these cells are compared with that for cells with uncoated anode electrodes as listed in Table 5.

TABLE 6

| Anode Coating | Li Lost (mAh equiv/$cm^2$) | $E_{init} \rightarrow E_{final}$ (V)   (V) | t to 0.9 $E_{final}$ (s) |
|---|---|---|---|
| Uncoated | 3.0 | 2.02 → 3.34 | 8.5 |
| Cured Epoxy | 1.4 | 2.58 → 3.34 | 1.8 |

As shown from the data in Table 6 the rate of self-discharge was reduced by more than 50% with the cured epoxy resin-coated anodes, and the initial load voltage was raised by more than 0.5 volts. The time required to approach a quasi-stable load voltage was reduced by about 80%.

EXAMPLE VII

Electrochemical cells similar to those described in Example V were fabricated and measured in the same manner with the exception of the cured epoxy resin employed. The anode coating was the bisphenol-A liquid epoxy resin EPON 828 together with the aliphatic polyamine curing agent EPON V-40. The average self-discharge and initial performance data of these cells after 2 months storage at 25° C. are compared in Table 7 with the data for cells having uncoated anode electrodes from Tables 5 and 6.

TABLE 7

| Anode Coating | Li Lost (mAh equiv/cm$^2$) | $E_{init}$ (V) → | $E_{final}$ (V) | t to 0.9 $E_{final}$ (s) |
| --- | --- | --- | --- | --- |
| Uncoated | 3.0 | 2.02 → | 3.34 | 8.5 |
| Cured Epoxy | 2.2 | 3.12 → | 3.50 | 0.2 |

As shown an approximately 25% reduction in the rate of self-discharge during storage was obtained by employing cured epoxy resin-coated anode electrodes. In addition, anode passivation was virtually eliminated.

EXAMPLE VIII

Electrochemical cells were fabricated and tested in a manner similar to that as described in Example V. The epoxy resin employed was EPON 828 combined with 4,4'-diaminodiphenyl sulfone as a curing agent. The electrolytic solution was 1.5M lithium tetrachloroaluminate (LiAlCl$_4$) in sulfuryl chloride (SO$_2$Cl$_2$). The self-discharge and initial polarization data obtained with these cells after storage for 2 months at 25° C. are shown in Table 8 compared to data for similar cells with uncoated anode electrodes.

TABLE 8

| Anode Coating | Li Lost (mAh equiv/cm$^2$) | $E_{init}$ (V) → | $E_{final}$ (V) | t to 0.9 $E_{final}$ (s) |
| --- | --- | --- | --- | --- |
| Uncoated | 22.1 | 2.94 → | 3.48 | 0.2 |
| Cured Epoxy | 7.9 | 3.08 → | 3.78 | 0.2 |

As indicated, the electrochemical cells having the cured epoxy resin coating on the anode electrodes produced an approximately 65% reduction in self-discharge and also a significant decrease in initial polarization.

EXAMPLE IX

Cells similar to those of Example VIII, but employing an epoxy resin of EPON 828 combined with EPON curing agent Y for coating the anode electrodes were fabricated and tested. The self-discharge and initial polarization data obtained with these cells after storage for 2 months at 25° C. are compared in Table 9 with that for cells having uncoated anode electrodes from Table 8.

TABLE 9

| Anode Coating | Li Lost (mAh equiv/cm$^2$) | $E_{init}$ (V) → | $E_{final}$ (V) | t to 0.9 $E_{final}$ (s) |
| --- | --- | --- | --- | --- |
| Uncoated | 22.1 | 2.94 → | 3.48 | 0.2 |
| Cured Epoxy | 6.4 | 3.07 → | 3.79 | 0.1 |

The improvement in self-discharge characteristics and in anode passivation is greater than that obtained with the cells of Example VIII.

EXAMPLE X

Electrochemical cells similar to those of Example VIII and IX but employing EPON 828 and EPON V-40 curing agent were fabricated, stored for 2 months at 25° C., and tested. The self-discharge and initial polarization data for these cells with cured epoxy-coated anode electrodes are compared in Table 10 with the data for cells with uncoated anodes as shown in Tables 8 and 9.

TABLE 10

| Anode Coating | Li Lost (mAh equiv/cm$^2$) | $E_{init}$ (V) → | $E_{final}$ (V) | t to 0.9 $E_{final}$ (s) |
| --- | --- | --- | --- | --- |
| Uncoated | 22.1 | 2.94 → | 3.48 | 0.2 |
| Cured Epoxy | 8.3 | 3.12 → | 3.80 | 0.2 |

A 60% reduction in self-discharge and a substantial reduction in polarization on load were obtained with the cells employing cured epoxy resin-coated anode electrodes as compared to those containing uncoated anode electrodes.

EXAMPLE XI

Electrochemical cells were fabricated with some of the anode electrodes being coated with cyanoacrylate and with others coated with an epoxy resin of EPON 828 and EPON V-40 curing agent. The electrolytic solution for the cells was 1.5M lithium tetrachloroaluminate (LiAlCl$_4$) in thionyl chloride (SOCl$_2$). The cells were stored for 2 months at 25° C. The average self-discharge and initial polarization measurements after storage are listed in Table 11.

TABLE 11

| Anode Coating | Li Lost (mAh equiv/cm$^2$) | $E_{init}$ (V) → | $E_{final}$ (V) | t to 0.9 $E_{final}$ (s) |
| --- | --- | --- | --- | --- |
| Cyanoacrylate | 3.2 | 1.42 → | 3.38 | 0.9 |
| Cured Epoxy | 2.2 | 3.12 → | 3.50 | 0.2 |

EXAMPLE XII

Electrochemical cells were fabricated with some of the anode electrodes being coated with cyanoacrylate and with others coated with an EPON 828 resin combined with EPON curing agent Y. The electrolytic solution was 1.5M lithium tetrachloroaluminate (LiAlCl$_4$) in sulfuryl chloride (SO$_2$Cl$_2$). The average self-discharge and initial polarization results after storage for 2 months at 25° C. are compared in Table 12.

TABLE 12

| Anode Coating | Li Lost (mAh equiv/cm$^2$) | $E_{init}$ (V) → | $E_{final}$ (V) | t to 0.9 $E_{final}$ (s) |
| --- | --- | --- | --- | --- |
| Cyanoacrylate | 7.6 | 1.84 → | 3.37 | 5.2 |
| Cured Epoxy | 6.4 | 3.07 → | 3.79 | 0.1 |

As illustrated by the foregoings examples the passivation and self-discharge problems in lithium/oxyhalide electrochemical cells may be greatly alleviated by coating the lithium anode electrode with a cured epoxy resin film. Further advantages include increased discharge capacities, presumably due to reduced self-discharge, and very low short circuit currents which may be attributed to the high ionic resistance of the films.

While there has been shown and described what are considered preferred embodiments of the present invention, it will be obvious to those skilled in the art that various changes and modifications may be made therein without departing from the invention as defined by the appended claims.

What is claimed is:

1. An electrochemical cell comprising
    an oxidizable anode electrode;
    a cathode current electrode; and
    an electrolytic solution, in contact with the anode electrode and the cathode current collector, comprising a reducible liquid cathode material and an electrolyte solute dissolved therein;
    the surface of the anode electrode in contact with the electrolytic solution being coated with a layer of cured epoxy resin.

2. An electrochemical cell in accordance with claim 1 wherein
    said cured epoxy resin is a cured bisphenol-A resin or a cured tetrafunctional resin.

3. An electrochemical cell in accordance with claim 2 wherein
    said oxidizable anode electrode includes a material selected from the group consisting of alkali metals and alkaline earth metals.

4. An electrochemical cell in accordance with claim 3 wherein
    the reducible liquid cathode material is selected from the group consisting of fluid oxyhalides, fluid non-metallic oxides, fluid non-metallic halides, and mixtures thereof.

5. An electrochemical cell in accordance with claim 4 wherein
    said cured epoxy resin is a cured bisphenol-A/epichlorohydrin resin.

6. An electrochemical cell in accordance with claim 5 wherein
    said layer of cured epoxy resin is formed by curing a coating of bisphenol-A/epichlorohydrin resin combined with a curing agent.

7. An electrochemical cell in accordance with claim 6 wherein
    said curing agent is a material selected from the group consisting of linear polyamines, aromatic amines, amine adducts, polyamides, amidoamines, acid anhydrides, Lewis acid complexes, and combinations thereof.

8. An electrochemical cell in accordance with claim 7 wherein
    said oxidizable anode electrode comprises lithium metal; and
    the reducible liquid cathode material is a liquid oxyhalide.

9. An electrochemical cell in accordance with claim 8 wherein
    the reducible liquid cathode material is thionyl chloride or sulfuryl chloride.

10. The method of reducing passivation of an oxidizable anode electrode used in an electrochemical cell having a reducible liquid cathode material comprising
    providing on the surface of the anode electrode a layer of cured epoxy resin.

11. The method in accordance with claim 10 comprising prior to assembly of the electrochemical cell
    coating said anode electrode with an epoxy resin and a curing agent for the epoxy resin; and
    curing the epoxy resin to a thermoset state to form an adherent layer of cured epoxy resin on said anode electrode.

12. The method in accordance with claim 11 wherein
    said epoxy resin in a bisphenol-A resin or a tetrafunctional resin.

13. The method cell in accordance with claim 12 wherein
    said oxidizable anode electrode includes a material selected from the group consisting of alkali metals and alkaline earth metals.

14. The method cell in accordance with claim 13 wherein
    the reducible liquid cathode material is selected from the group consisting of fluid oxyhalides, fluid non-metallic oxides, fluid non-metallic halides, and mixtures thereof.

15. The method in accordance with claim 14 wherein
    said epoxy resin is a bisphenol-A/epichlorohydrin resin.

16. The method in accordance with claim 15 wherein
    said curing agent is a material selected from the group consisting of linear polyamines, aromatic amines, amine adducts, polyamides, amidoamines, acid anhydrides, Lewis acid complexes, and combinations thereof.

17. The method cell in accordance with claim 16 wherein
    said oxidizable anode electrode comprises lithium metal; and
    the reducible liquid cathode material is a liquid oxyhalide.

18. The method in accordance with claim 17 wherein
    the reducible liquid cathode material is thionyl chloride or sulfuryl chloride.

* * * * *